United States Patent [19]
Hossain

[11] Patent Number: 5,595,839
[45] Date of Patent: Jan. 21, 1997

[54] BIPOLAR LITHIUM-ION RECHARGEABLE BATTERY

[75] Inventor: Sohrab Hossain, Niantic, Conn.

[73] Assignee: Yardney Technical Products, Inc., Pawcatuck, Conn.

[21] Appl. No.: 456,391

[22] Filed: Jun. 1, 1995

Related U.S. Application Data

[63] Continuation-in-part of Ser. No. 322,587, Oct. 13, 1994, abandoned.

[51] Int. Cl.$^6$ .......................... H01M 10/40; H01M 4/96; H01M 4/36
[52] U.S. Cl. .......................... 429/210; 429/218; 429/221
[58] Field of Search ................................ 429/210, 218, 429/221

[56] References Cited

U.S. PATENT DOCUMENTS

| | | | |
|---|---|---|---|
| 4,421,834 | 12/1983 | Zupancic | 429/105 |
| 4,490,446 | 12/1984 | Ramsay et al. | 429/57 |
| 4,925,753 | 5/1990 | Schlaikjer | 429/196 |
| 5,254,415 | 10/1993 | Williams et al. | 429/153 |
| 5,273,842 | 12/1993 | Yamahira et al. | 429/94 |

Primary Examiner—Stephen Kalafut
Assistant Examiner—Richard H. Lilley, Jr.
Attorney, Agent, or Firm—John R. Doherty

[57] ABSTRACT

A novel and improved rechargeable, lithium-ion battery system is composed of a plurality of individual electrochemical cells having positive and negative electrodes disposed in opposite face-to-face arrangement with a porous separator containing electrolyte therebetween, and wherein the positive and negative electrodes of adjacent cells are disposed in contact respectively with opposite sides of a common current-collecting element forming a unitary bipolar structure. The negative electrode comprises a layer of carbon adhered to one side of the current-collecting element while the positive electrode comprises a layer containing a lithium transition metal oxide or sulfide compound adhered to the other opposite side of the element. The unitary bipolar structures containing the positive and negative electrodes of adjacent cells include outer peripheral, electrically-insulating seal members, preferably in the form of plastic insulating rings, which are joined together in a sealed stacked array.

20 Claims, 11 Drawing Sheets

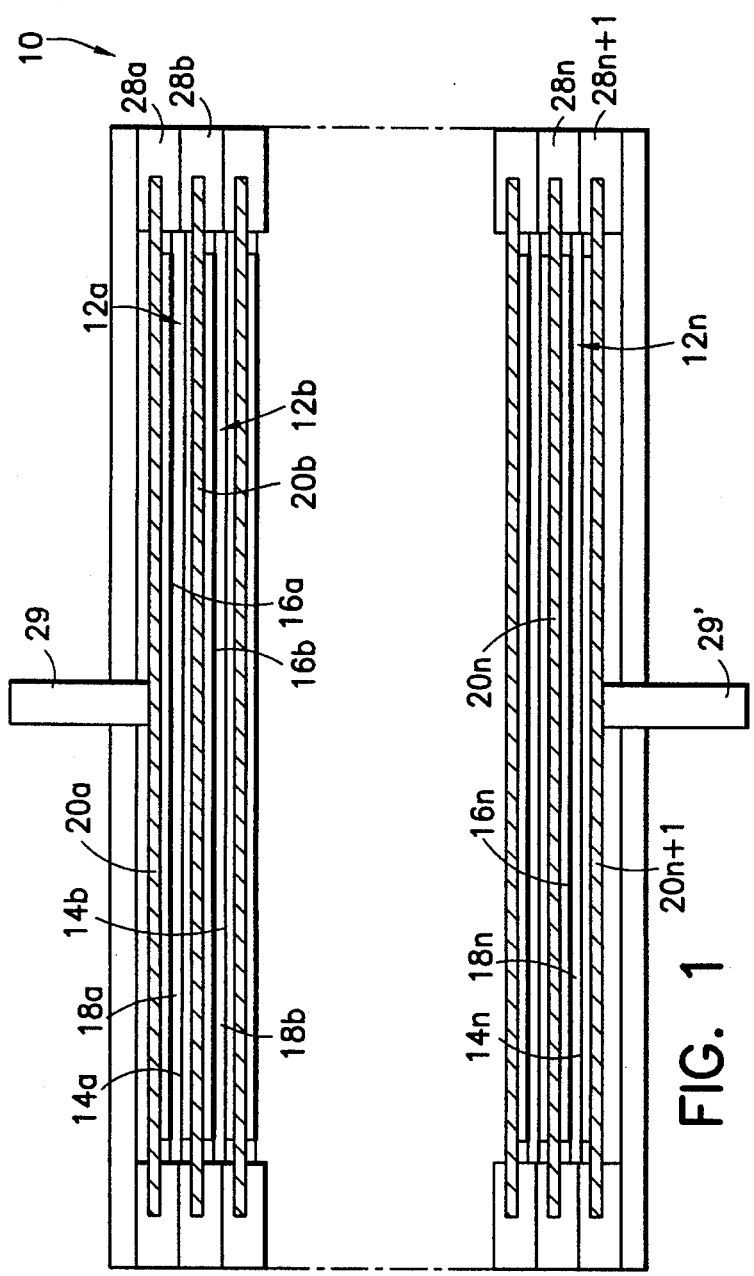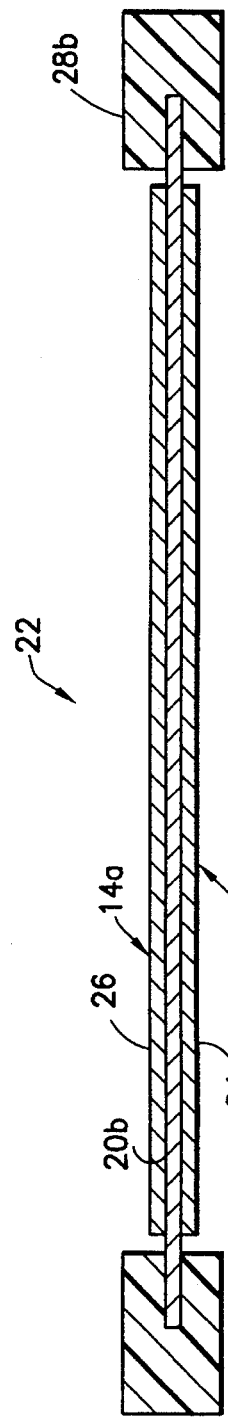

DISCHARGE BEHAVIOR OF CYLINDRICAL Li-ion CELL AT 1 mA/cm²

CONTINUOUS (1 mA/cm2) AND PULSE (8 mA/cm2) DISCHARGE BEHAVIOR OF A CYLINDRICAL Li-ion CELL DISCHARGE BEHAVIOR OF A Li-ion CELL AT 2 mA/cm² (AFTER DELIVERING 3000 PULSE CYCLES)

CHARGE/DISCHARGE BEHAVIOR OF A 4-CELL STACK Li-ion BATTERY AT 5 mA/cm² CHARGE FOR 45 SEC. AND 45 mA/cm² DISCHARGE FOR 5 SEC.

BIPOLAR LITHIUM-ION RECHARGEABLE BATTERY

RELATED APPLICATIONS

This application is a continuation-in-part of my prior application Ser. No. 08/322,587, now abandoned, filed on Oct. 13, 1994.

FIELD OF THE INVENTION

The present invention relates generally to bipolar non-aqueous rechargeable, secondary batteries and more particularly to such batteries employing carbon as the negative active material, lithiated transition metal oxides as the positive active material and nonaqueous electrolytes in bipolar configuration.

DESCRIPTION OF THE PRIOR ART

It is known that useful rechargeable, secondary electrochemical cells can be manufactured using a light weight alkaline metal, such as sodium, potassium and particularly lithium, as the source of metal ions exchanged between the positive and negative electrodes through the electrolyte during charge and discharge of the cells. These alkaline metals are particularly useful in combination with transition metal oxides, such as manganese oxide, as the positive active material. In the past, these alkaline metals, and particular lithium metal, have been used in their pure metallic state as the cell negative electrode in combination with a transition metal oxide as the positive electrode. It is commonly known, however, that lithium metal reacts violently with water and, accordingly, great care must be used to exclude any traces of moisture in assembling these cells.

In more recent years, researchers have developed a safe, rechargeable, secondary lithium cell which instead of a metallic lithium negative electrode employs an intercalation host electrode composed of carbon, suitably in the form of graphite or petroleum coke, for example. The host electrode is capable of intercalating and deintercalating lithium ion in its lattice structure during alternate charging and discharging of the cell. The positive electrode commonly employed in these cells consists of a lithiated transition metal oxide, for example. These compounds permit a reversible doping of lithium ion between the layers.

The electrochemical reactions that take place at the positive and negative electrodes of these so-called "lithium-ion cells" during the charge and discharge process may be represented as follows:

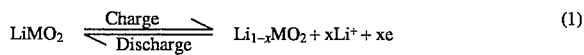

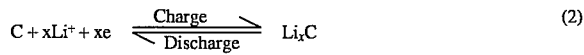

wherein "$MO_2$" represents a transition metal oxide, for example.

The inherent characteristics, e.g., slow intercalation process, organic electrolytes of relatively low ionic conductivity and the use of a non-metallic electrode, e.g. carbon, unfortunately make the so-called "lithium-ion cell" a relatively low rate system. Moreover, the present state of the art lithium-ion battery technology uses spirally wound or parallel plate monopolar designs which are not efficient for relatively high rate applications. These designs cause uneven utilization of materials and often lead to direct plating of metallic lithium on the carbon electrode surfaces rather than fully intercalating into the electrode structure.

Accordingly, it is the principle object of the present invention to provide a novel and improved rechargeable, lithium-ion battery system.

Another object of the present invention is to provide a novel and improved rechargeable, lithium-ion battery system which is useful in relatively high rate applications.

Still another object of the present invention is to provide a novel and improved, rechargeable, lithium-ion battery system which utilizes the active materials thereof more uniformly and efficiently than is possible with similar battery systems of the prior art.

Yet another object of the present invention is to provide a novel and improved rechargeable, lithium-ion battery system which does not require the use of auxiliary power sources to perform satisfactorily in relative high rate applications.

SUMMARY OF THE INVENTION

The foregoing and other objects, features and advantages are achieved by a rechargeable, bipolar, lithium-ion battery according to the present invention. The rechargeable, lithium-ion battery comprises a plurality of individual electrochemical cells having positive and negative electrodes disposed in opposite face-to-face arrangement with a porous separator containing electrolyte therebetween, and wherein the positive and negative electrodes of adjacent cells are disposed in contact respectively with opposite sides of a common current-collecting element forming a unitary bipolar structure. The negative electrode comprises a layer of carbon adhered to one side of the current-collecting element while the positive electrode comprises a layer containing a lithium transition metal oxide compound adhered to the other opposite side of the element. The unitary bipolar structures containing the positive and negative electrodes of adjacent cells include outer peripheral, electrically-insulating seal members, preferably in the form of plastic insulating rings, which join together in a sealed stacked array.

The current-collecting element used in the present bipolar lithium-ion battery may be composed of a bi-metallic substrate, preferably a thin aluminum-copper foil. The positive electrode containing the lithium transition metal oxide layer is adhered to the aluminum side of the foil whereas the negative electrode containing the carbon layer is adhered to the copper side of the foil.

A plurality of unitary bipolar structures containing the bi-metallic substrates with positive and negative electrode layers adhered to opposite sides are stacked together with a porous electrolyte-containing separator placed therebetween to form adjacent cells in the battery.

In a preferred embodiment of the present invention, the rechargeable, lithium-ion battery consists of a plurality of unitary bipolar structures including negative electrodes of carbon material on the copper-side of the bimetallic substrate, an electrolyte of lithium-salt in non-aqueous solvent(s), and positive electrodes of a lithiated transition metal oxide, e.g., $LiMn_2O_4$, on the aluminum-side of the bimetallic substrate.

BRIEF DESCRIPTION OF THE DRAWINGS

In the accompanying drawings:

FIG. 1 is an elevational, sectional view of a typical rechargeable, multi-cell, bipolar, lithium-ion battery constructed in accordance with the present invention;

FIG. 2 is an enlarged, sectional view of a unitary bipolar structure used in the lithium-ion battery of FIG. 1;

DESCRIPTION OF THE PREFERRED EMBODIMENTS

Figure 3:
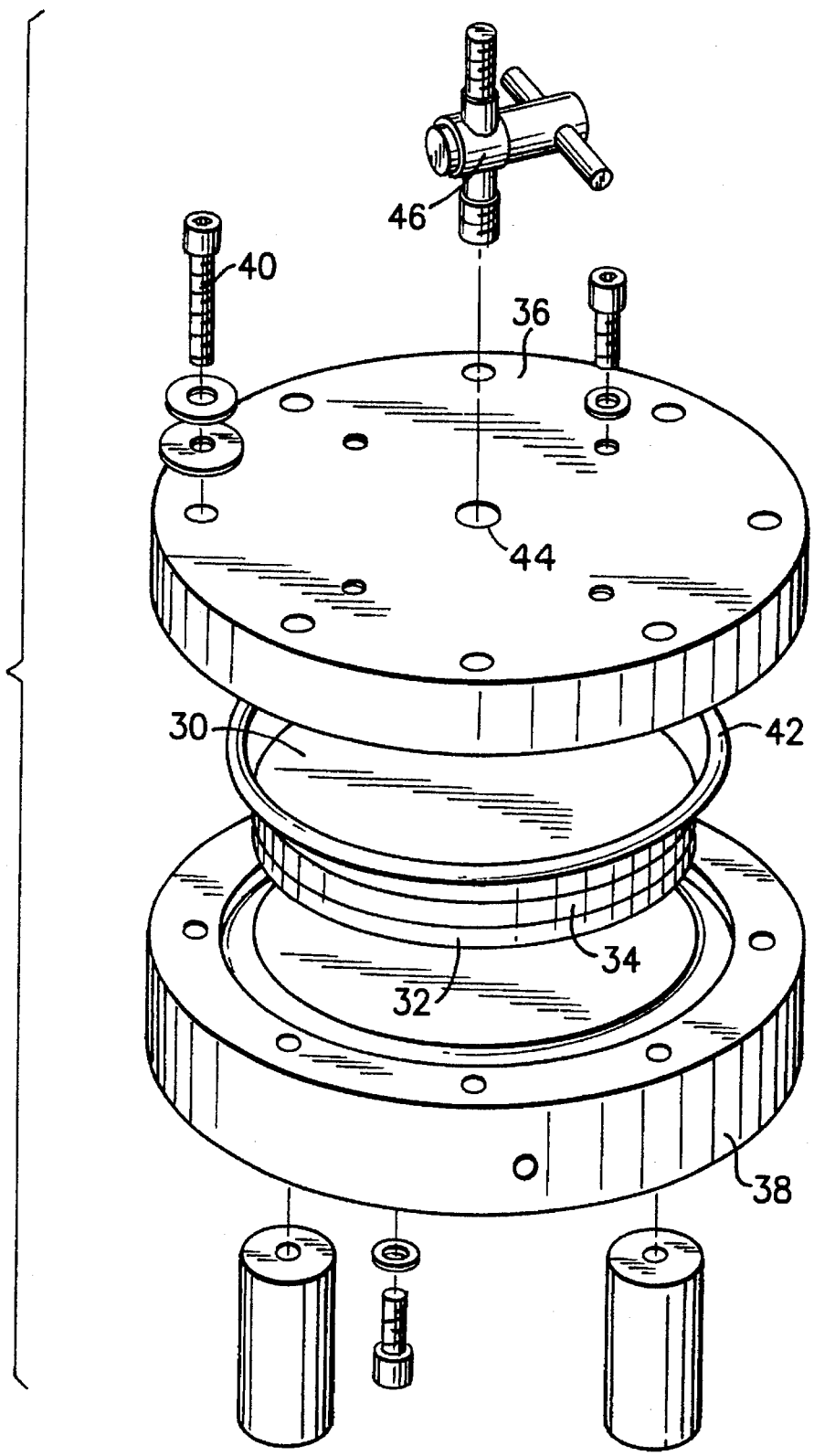
FIG. 3 is a perspective view of an individual, rechargeable, sample lithium-ion electrochemical cell used in various experimental tests to evaluate the concept of the present invention.

Referring now to the drawings in detail, there is shown in FIGS. 1 and 2 a rechargeable, bipolar, lithium-ion battery 10 constructed in accordance with the present invention. As shown, the bipolar, lithium-ion battery 10 comprises a plurality of individual electrochemical cells 12a, 12b, . . . 12n having positive electrodes 14a, 14b, . . . 14n and negative electrodes 16a, 16b . . . 16n, disposed in opposite face-to-face arrangement with porous separators 18a, 18b, . . . 18n containing electrolyte positioned therebetween. The positive and negative electrodes 14a, 14b, . . . 14n and 16a, 16b, . . . 16n, respectively, of adjacent cells are disposed in physical and electrical contact with the opposite sides of a common current-collecting element 20b, . . . 20n forming a plurality of unitary bipolar structures as shown in greater detail at 22 in FIG. 2. The negative electrodes comprise a layer of carbon 24, e.g., petroleum coke, carbon, graphite or mixtures thereof, adhered to one of the sides of the current-collecting elements and the positive electrodes comprise a layer containing a lithium transition metal oxide compound 26 or mixtures thereof adhered to the other opposite side of the element. As shown particularly in FIG. 2, the positive and negative electrodes preferably contact and adhere to substantially the entire surface areas of the respective sides of the current-collecting elements. Each of the unitary bipolar structures are mounted within an outer peripheral polymer ring 28b, . . . 28n which are joined together in a sealed stacked array.

In a preferred form of the present invention, the bipolar lithium-ion battery is comprised of negative electrodes of carbon materials having high lithium intercalation efficiency and positive electrodes containing $LiCoO_2$, $LiNiO_2$, $LiMn_2O_4$, $Li_2Mn_2O_4$ or combinations of these materials. In the preferred bipolar design, one side of a bi-metallic substrate is used for the negative electrode of a cell, while the other side is used for the positive electrode of another cell. The bi-metallic substrate is preferably a thin copper-aluminum foil, the copper side of which is used for negative carbon electrode anode and the other aluminum side for the positive lithiated transition metal oxide electrode. The solid non-conductive polymeric ring 28 is bonded around the outer side of the substrate in order to isolate electronically one cell from the other and seal the bipolar stack. The non-conducting ring 28 may suitably be made of polytetrafloroethylene, for example.

The electrolyte used in the bipolar battery of the invention is a non-aqueous, organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, dimethoxyethane and dimethyl carbonate as well as mixtures thereof.

FIGS. 1 and 2 show a battery containing a given number "n" of electrochemical cells in bipolar configuration. In the battery illustrated, there are n−1 bipolar structures with electrochemical composition on both sides and two end plates 20a and 20n+1 with electrochemical composition on only one side thereof. The top end plate 20a has a layer of carbon 24 of the negative electrode 16 on one side and is connected to the battery negative terminal 29 on the other side. The bottom end plate 20n+1 has a layer containing a lithium transmission metal oxide compound 26 of the positive electrode 14 on one side and is connected to the battery terminal 29' on the other side. The top and bottom end plates 20a and 20n+1 are each mounted within an outer peripheral polymer ring 28a and 28n+1, respectively.

The minimal resistance and uniform current and potential distribution of the bipolar design of the present invention minimizes concentration gradients and prevents polarization losses that could lead to direct plating of lithium on the carbon rather than intercalating into the electrode structure. The present invention, however, is not limited to that theory. Suffice it to say, as shall become more apparent in the following examples, it has been surprisingly discovered that a significant improvement in high rate performance, beyond what might normally be expected, is possible with the bipolar design of the present invention. The bipolar design of the present lithium-ion battery system does not require the coupling with other power sources to attain peak power requirements.

The following specific examples are given to illustrate the practice of the invention, but are not to be considered as limiting in any way.

EXAMPLE 1

In order to evaluate the bipolar concept of the present invention, a bipolar single cell (end plates of bipolar stack) was built as substantially shown in FIG. 3. The bipolar cell included a negative electrode 30 made from Petroleum coke, a lithiated cobalt dioxide positive electrode 32 and 1M PC:DME (propylene carbonate: di-methoxyethane) solvent for a (50:50)/LiClO$_4$ electrolyte. A microporous polypropylene separator 34 was used in between the positive and negative electrodes to isolate them electronically. Petroleum coke carbon material was mixed with 2% polyvinyledene fluoride binder in dimethyl formamide and spray-coated on a copper-plate 36 to form the negative electrode. LiCoO$_2$ mixed with 6% Asbury graphite and 4% TEFLON (polytetrafluoroethylene) was pressed onto a Teflon-rich (polytetrafluoroethylene) carbon coated aluminum plate 38. The two plates 36, 38 were placed over each other with the separator 34 in between and compressed with screws around the edges as shown at 40.

A TEFLON (polytetrafluoroethylene) O-ring 42 was used to seal the cell. The cell is vacuum-filled with the electrolyte through an opening 44 at the top of the copper plate 36. The opening is kept closed with a two-way fill valve 46.

Figure 4:
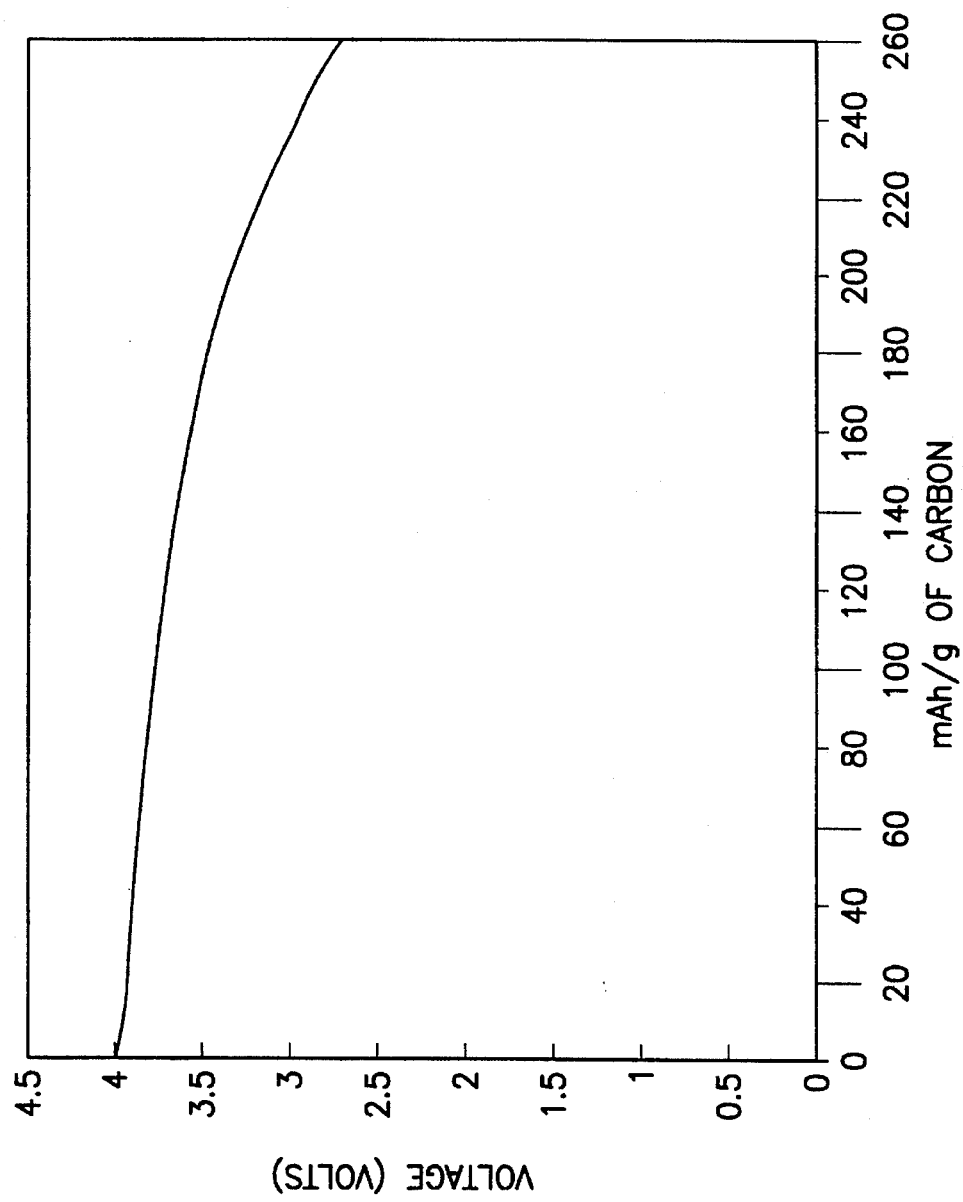
FIG. 4 is a graph representing the discharge behavior of a rechargeable, electrochemical test cell made in accordance with the present invention.

FIG. 4 shows the discharge behavior of the cell at 1.5 mA/cm$^2$ between the voltage limits 2.75 and 4.1 V. The cell delivered capacity of about 260 mAh/g of carbon.

An electrochemical cylindrical wound cell was made with the same active components as described above. The cell was charged/discharge at 1 mA/cm$^2$ in the voltage limits of 4.1 and 2.75 V.

Figure 5:
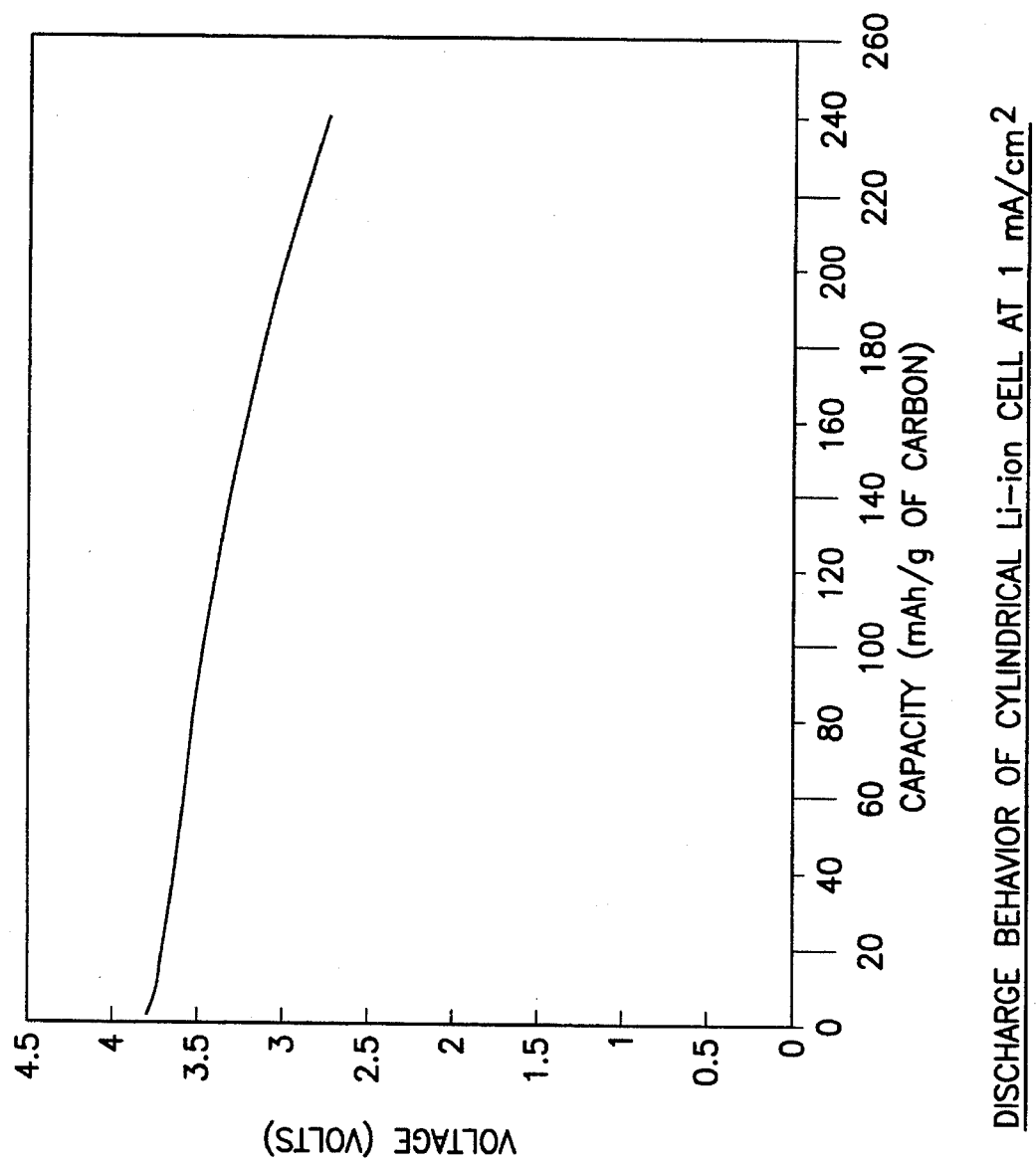
FIG. 5 is a similar graph representing the discharge behavior of a cylindrical wound, rechargeable, lithium-ion cell made in accordance with the prior art.

FIG. 5 shows the discharge behavior of this prior art cell. The cell delivered about 240 mAh/g of carbon capacity. The bipolar single cell showed a much better voltage profile than the cylindrical cell.

EXAMPLE 2

Figure 6:
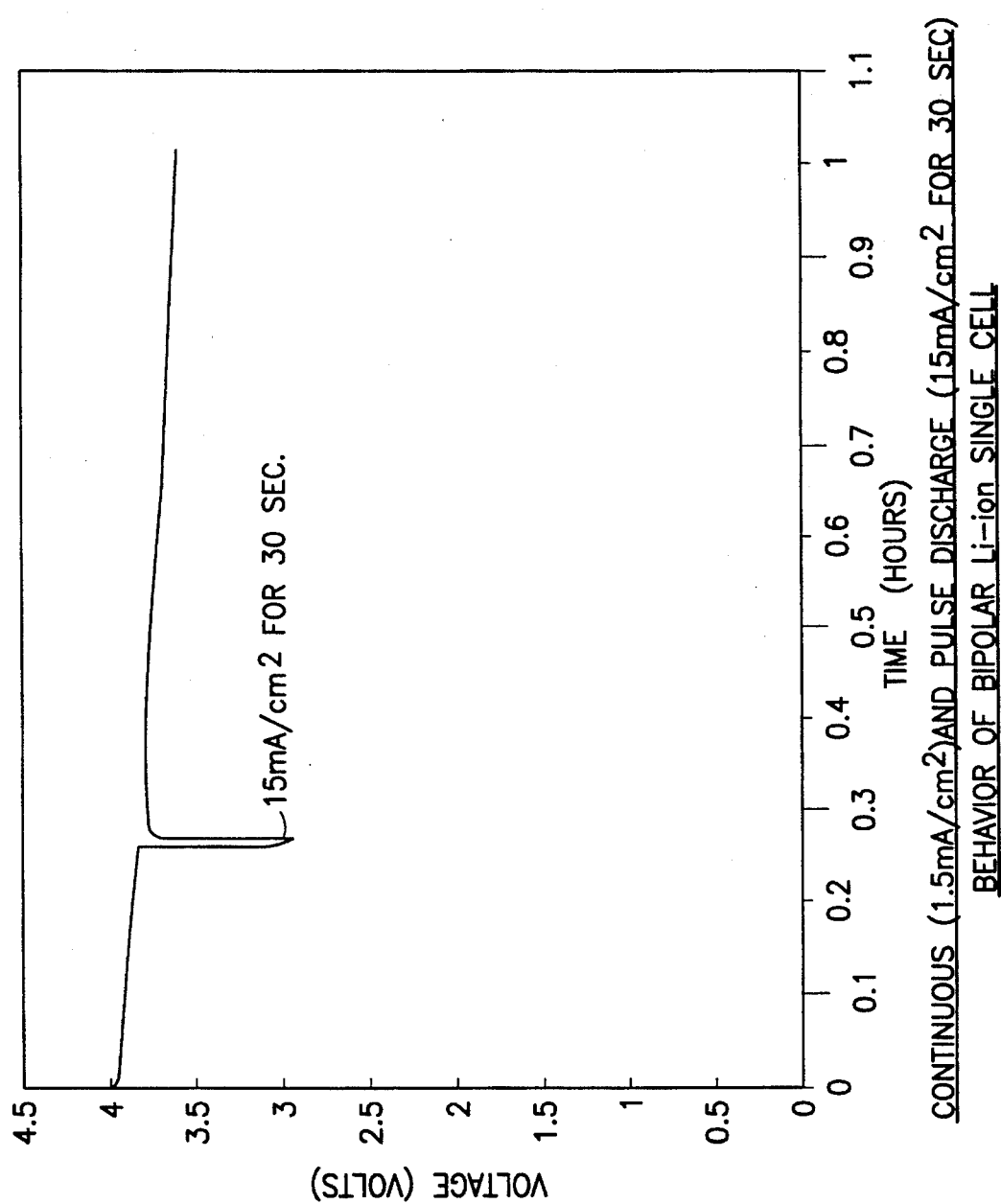
FIG. 6 is a graph representing the continuous and pulse discharge characteristics of a rechargeable, electrochemical test cell made in accordance with the present invention.
Figure 7:
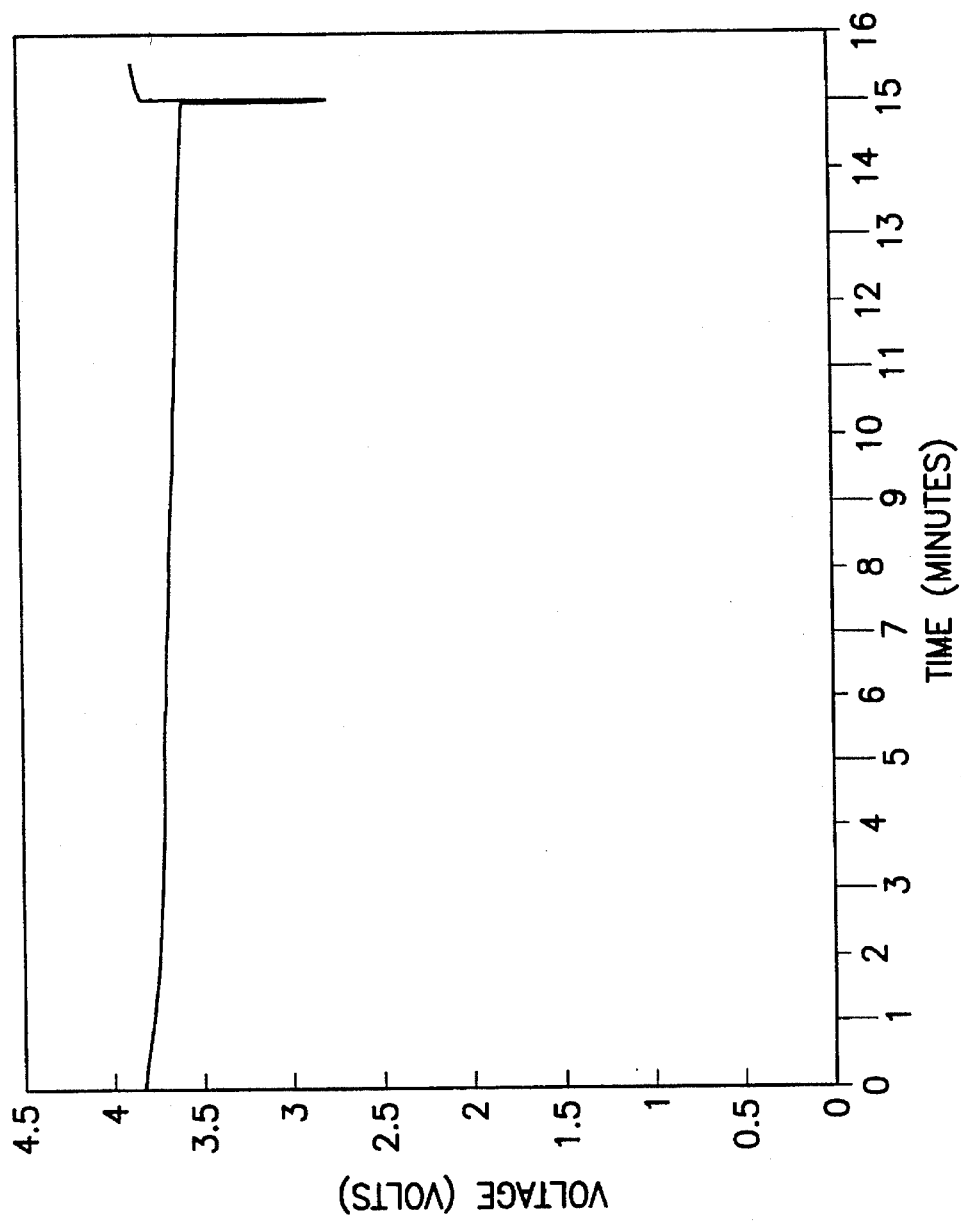
FIG. 7 is a similar graph representing the continuous and pulse discharge characteristics of a cylindrical wound, rechargeable, lithium-ion cell made in accordance with the prior art.

A bipolar single cell and a cylindrical wound cell were made with the same electrolyte and electrode materials as those in Example 1. Both cells were charged and discharged between the voltage limits 4.1 and 2.75 V. The bipolar single cell was cycled at 1.5 mA/cm$^2$ and the cylindrical cell at 1 mA/cm$^2$. (The cylindrical cell could not perform satisfactorily at the higher discharge rate). After the first charge-discharge cycle, the pulse response of these cells was examined. Both the cells were charged to 4.1 V. The bipolar cell was then discharged at 1.5 mA/cm$^2$ for 15 minutes and 15 mA/cm$^2$ for 30 seconds and the next period with 1.5 mA/cm$^2$. The discharge behavior is shown in FIG. 6. FIG. 7 shows the continuous and pulse discharge behavior of the cylindrical cell. The cylindrical cell was discharged first at 1 mA/cm$^2$ for 15 minutes and then at 8 mA/cm$^2$. The cell could not take the load of even 8 mA/cm$^2$ instead of 15 mA/cm$^2$ and immediately hit the lower voltage limit and went to the charged state.

EXAMPLE 3

A bipolar single cell and a prismatic flat electrode cell were made with the same electrolyte and electrode materials as those in Example 1. Both cells were charged and discharged at 3 mA/cm$^2$ in the voltage limits of 4.1 V and 2.75 V. After 9 complete cycles, the cells were charged at 3 mA/cm$^2$ to 4.1 V and then disconnected from the cycler. The cells were then dissected in an argon-filled glove box in order to examine the cell components visually. The negative carbon electrode of the prismatic cell showed the evidence of shiny, dendritic metallic lithium on the surface. No such evidence of metallic lithium was found on the carbon surface of bipolar single cell.

EXAMPLE 4

Figure 8:
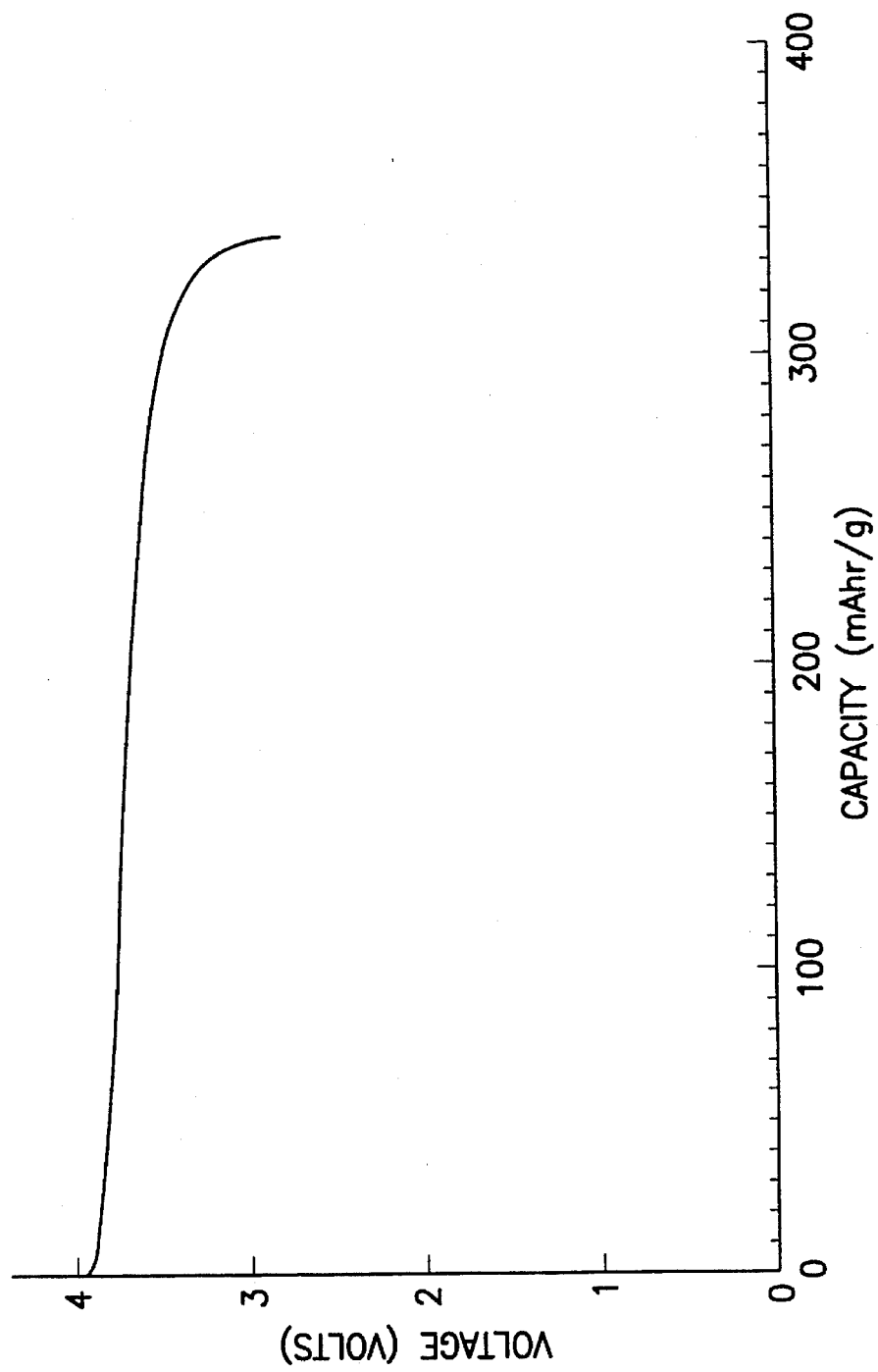
FIG. 8 is a graph representing the discharge behavior of a rechargeable, lithium-ion test cell made in accordance with the present invention.
Figure 9:
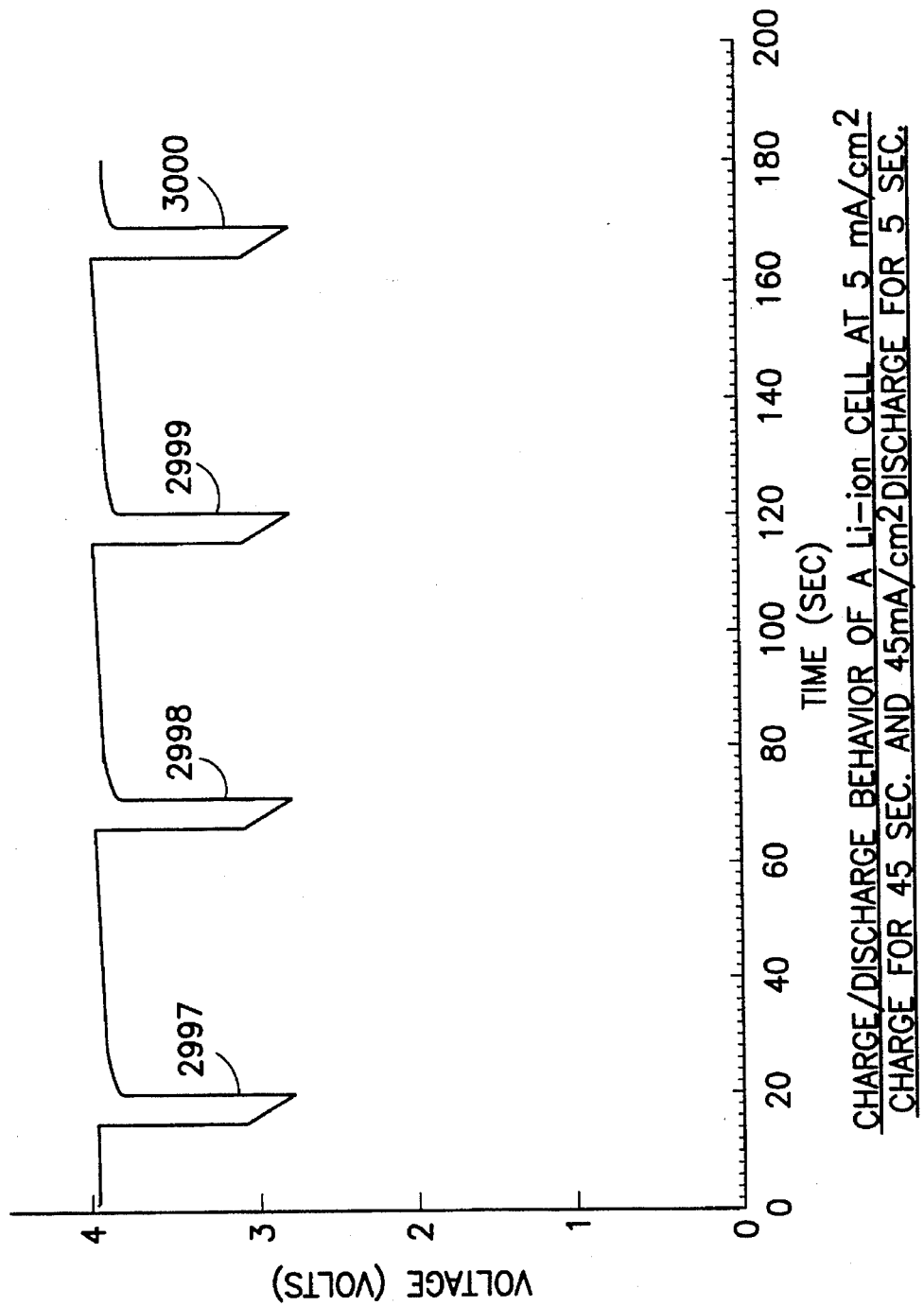
FIG. 9 is a graph representing the high rate pulse charge/discharge characteristics of a lithium-ion test cell made in accordance to the present invention.
Figure 10:
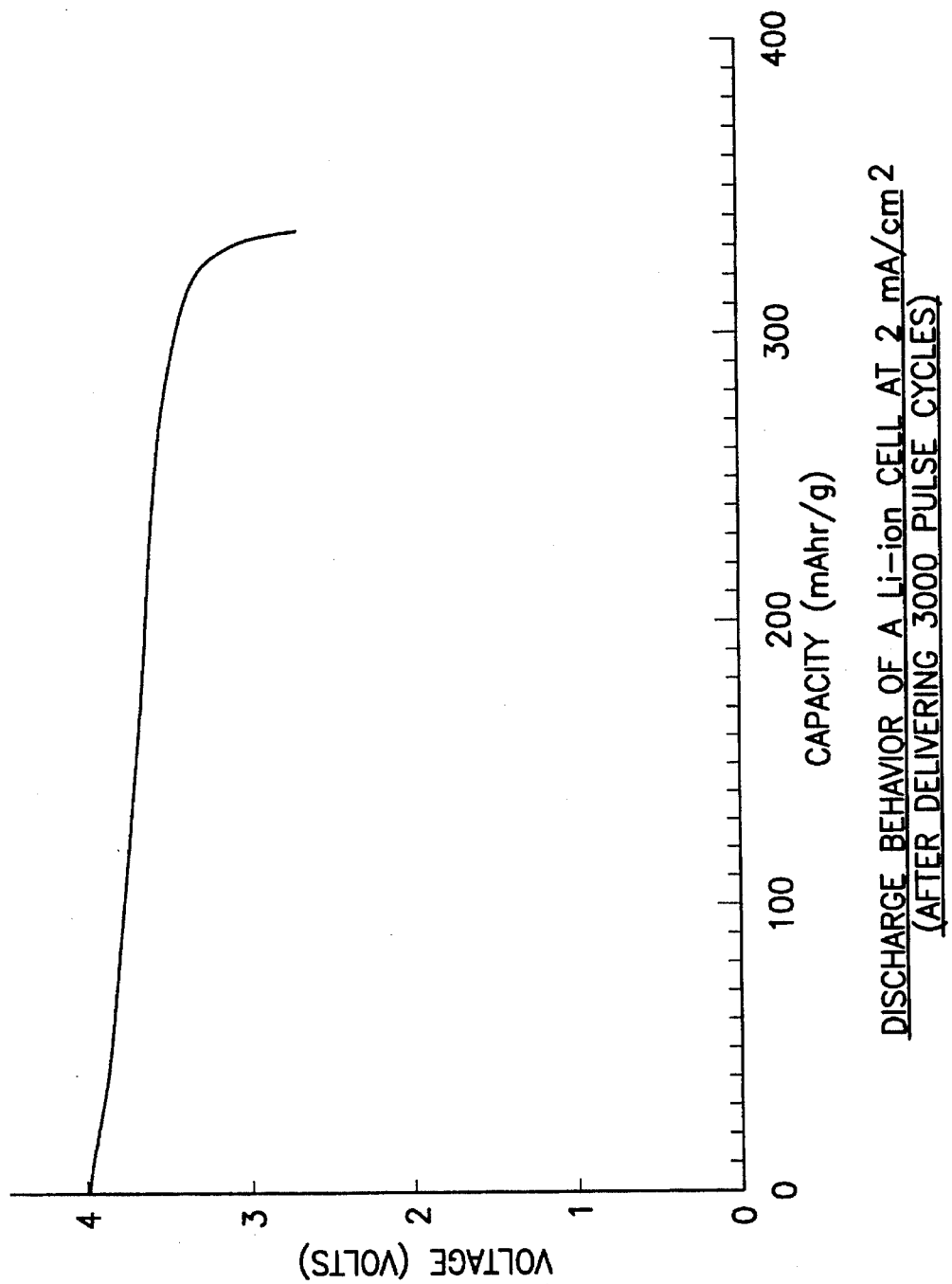
FIG. 10 is a graph representing the continuous discharge behavior of the lithium-ion test cell after high-rate pulse charge/discharge performance.

A lithium-ion cell was developed in bipolar configuration as in Example 1 using graphite anode, lithiated cobalt dioxide cathode and 1M LiPF$_6$/in a mixture of ethylene carbonate and diethyl carbonate (1:1 v/v). The continuous discharge characteristics of the cell are shown in FIG. 8 at 1.5 mA/cm$^2$. The cell delivered an anode capacity of 340 mAh/g, close to the theoretical capacity of 372 mAh/g corresponding to LiC$_6$. The same cell was then tested for high rate pulse power applications. The cell was discharged at 45 mA/cm$^2$ for 5 seconds and charged at 5 mA/cm$^2$ for 45 seconds in the voltage limits of 2.75–4.1 V. The charge/discharge characteristics are shown in FIG. 9. After 3000 pulse cycles (pulse cycles are numbered 2997–3000 in FIG. 9), the cycling was intentionally terminated in order to examine again the continuous discharge behavior of the cell. The cell was charged to 4.1 V and discharged to 2.75 V at 2 mA/cm$^2$. FIG. 10 represents the discharge profile. The cell delivered a capacity of 334 mAh/g of carbon. The above results indicate that lithium-ion cells in bipolar configuration can provide long cycle life under pulse power conditions without affecting the continuous discharge characteristics.

EXAMPLE 5

A four-cell stack bipolar battery was built with the same electrolyte and electrode materials as in Example 1. The electrode substrate was bimetallic. One side was aluminum and the other side was copper. The diameter of the substrate was about 4 inches. Around the edge of the substrate, a TEFZEL (tetrafluoroethylene-ethylene copolymer) ring was molded which was used as insulation and seal of each cell. After activation with proper amounts of electrolyte in an argon-purged dry room area, the four-cell bipolar stack was compressed using a flange around the edges. The compression provides good sealing. Additional sealing is assured by melting and bonding the outside TEFZEL (tetrafluoroethylene-ethylene copolymer) rings. The bipolar design was essentially the same as that shown in FIGS. 1 and 2 of the drawing.

Figure 11:
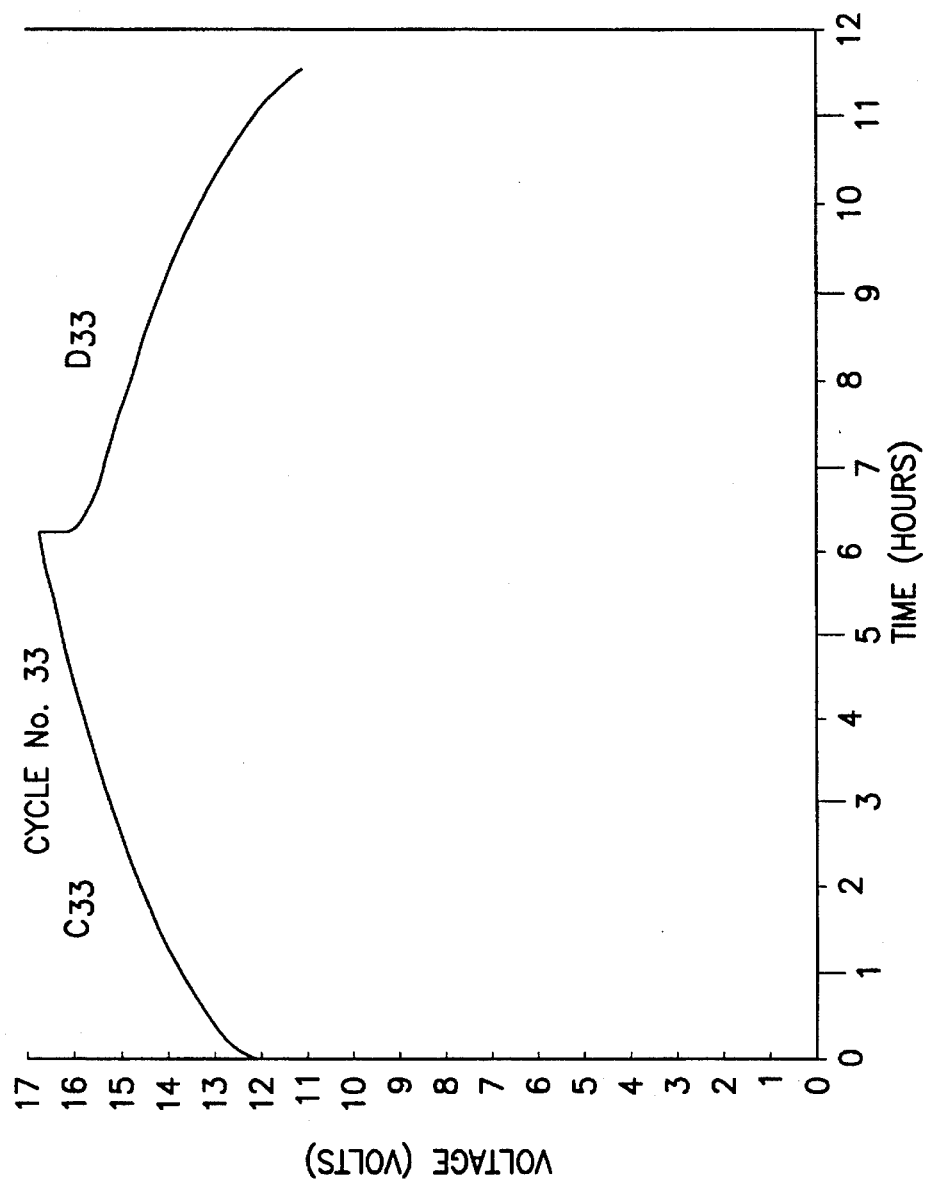
FIG. 11 is a graph representing the charge-discharge characteristics of a four-cell stack, rechargeable, bipolar, lithium-ion battery made in accordance with the present invention.

FIG. 11 shows the charge/discharge characteristics of the four-cell stack bipolar battery at 1.5 mA/cm$^2$ between the voltage limits of 16.4 V and 11.0 V. The battery delivers 255 mAh/g carbon capacity.

EXAMPLE 6

Figure 12:
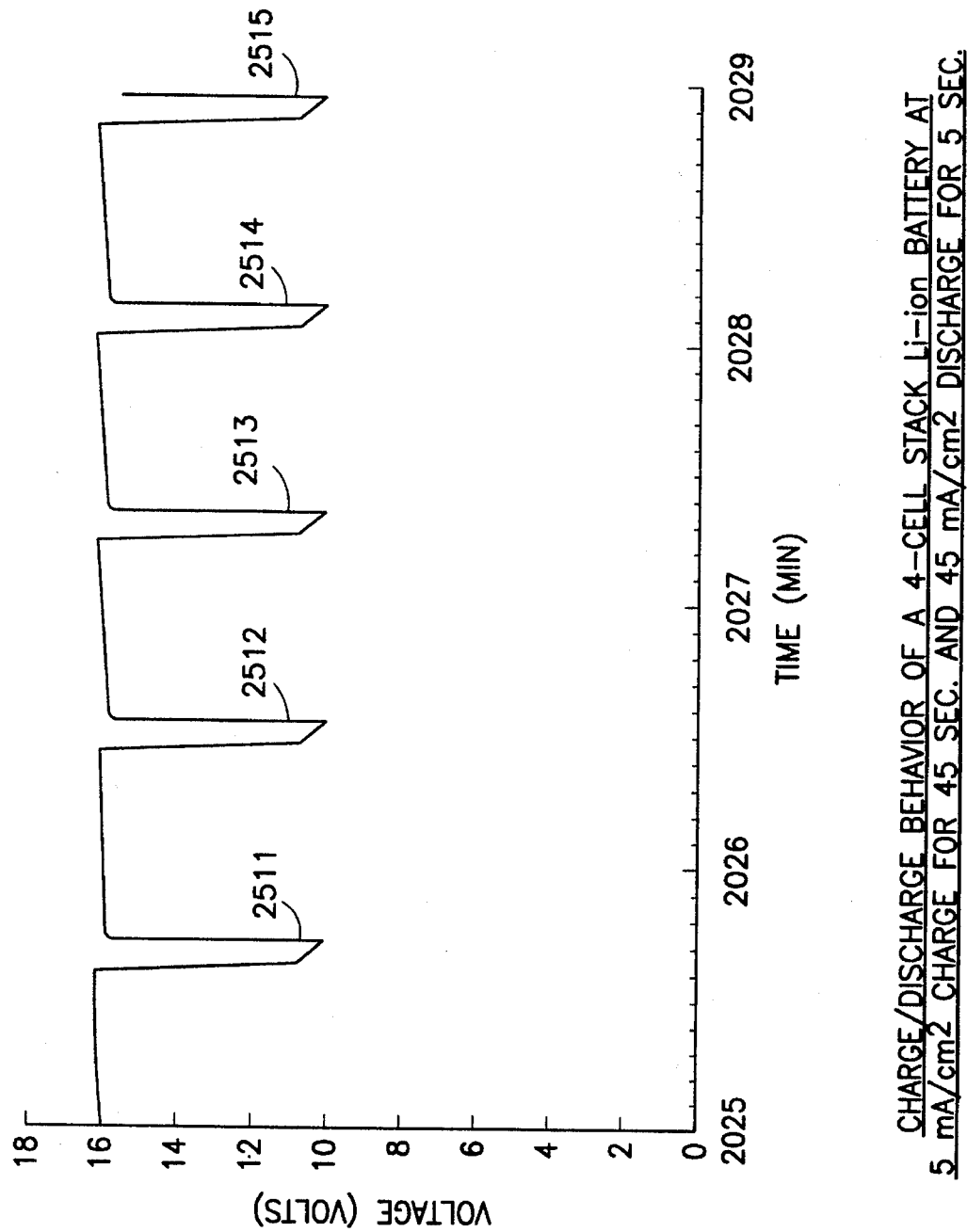
FIG. 12 is a graph representing the high-rate pulse charge/discharge characteristics of a four-cell stack, rechargeable bipolar lithium-ion battery made in accordance with the present invention.

A four-cell stack bipolar battery was made as in Example 5 with graphite anode and lithiated nickel oxide cathode using 1M LiAsF$_6$ in a mixture (1:1 v/v) of ethylene carbonate and dimethyl carbonate. The battery was discharged at 45 mA/cm$^2$ for 5 seconds and then charged at 5 mA/cm$^2$ for 5 seconds. The pulse cycling behavior for the cycle numbers 2511–2515 is shown in FIG. 12.

What is claimed is:

1. A bipolar rechargeable lithium-ion battery comprising: a plurality of individual electrochemical cells having positive and negative electrodes disposed in opposite face-to-face arrangement with a porous separator containing electrolyte therebetween, wherein the positive and negative electrodes of adjacent cells are disposed in electrical connection respectively with opposite sides of a common current-collecting element forming a unitary bipolar structure, said negative electrode comprising a layer of carbon adhered to one of said opposite sides of said current-collecting element and said positive electrode comprising a layer containing a lithium transition metal oxide compound adhered to the other opposite side of said element, and wherein said electrolyte comprises a lithium salt dissolved in a non-aqueous, organic solvent, and means for joining said unitary bipolar structure of adjacent cells together in a sealed stacked array.

2. A bipolar rechargeable lithium-ion battery according to claim 1, wherein said positive electrode comprises a lithiated transition metal oxide selected from the group consisting of $LiCoO_2$, $LiNiO_2$, $LiMn_2O_4$, $Li_2Mn_2O_4$ or combinations of these materials.

3. A bipolar rechargeable lithium-ion battery according to claim 2, wherein said negative electrode comprises petroleum coke, carbon, graphite or mixtures thereof.

4. A bipolar rechargeable lithium-ion battery according to claim 3, wherein said current-collecting element includes a bi-metallic member composed of copper on one side and aluminum on the other side thereof.

5. A bipolar rechargeable lithium-ion battery according to claim 4, wherein said negative carbon electrode is disposed adjacent to and in electrical connection with the copper side of said current-collecting element and wherein said positive transition metal oxide electrode is disposed adjacent to and in electrical connection with the aluminum side of said element.

6. A bipolar rechargeable lithium-ion battery according to claim 1, wherein said electrolyte is a non-aqueous solution comprising a solute selected from the group consisting of $LiPF_6$, $LiBF_4$, $LiAsF_6$, $LiCF_3SO_3$, $LiN(CF_3SO_2)_2$ and $LiClO_4$ and mixtures thereof, dissolved in a solvent selected from the group consisting of propylene carbonate, ethylene carbonate, diethyl carbonate, dimethoxyethane and dimethyl carbonate and mixtures thereof.

7. A bipolar rechargeable lithium-ion battery according to claim 1, wherein said means for joining said unitary bipolar structure of adjacent cells together comprises a non-conducting polymer ring surrounding the outer peripheral edges of said current-collecting element.

8. A unitary bipolar structure for use in a rechargeable, lithium-ion battery comprising a solid, liquid impermeable, current-collecting element having opposite sides comprising respectively copper and aluminum, a negative electrode comprising a layer of carbon adhered to one of said opposite sides of said element and a positive electrode comprising a layer containing a lithium transition metal oxide compound adhered to the other opposite side of said element.

9. A unitary bipolar structure according to claim 8, wherein said positive electrode comprises a lithiated transition metal oxide selected from the group consisting of $LiCoO_2$, $LiNiO_2$, $LiMn_2O_4$, $Li_2Mn_2O_4$ and combinations of these materials.

10. A unitary bipolar structure according to claim 9, wherein said negative electrode comprises petroleum coke, carbon, graphite or mixtures thereof.

11. A unitary bipolar structure according to claim 10, wherein said negative carbon electrode is disposed adjacent to and in electrical connection with the copper side of said current-collecting element and wherein said positive transition metal oxide electrode is disposed adjacent to and in electrical connection with the aluminum side of said element.

12. A bipolar rechargeable lithium-ion battery comprising: a plurality of individual electrochemical cells having positive and negative electrodes disposed in opposite face-to-face arrangement with a porous separator containing electrolyte therebetween, and wherein the positive and negative electrodes of adjacent cells are disposed in physical and electrical contact respectively with opposite sides of a common current-collecting element forming a unitary bipolar structure, said current-collecting element comprising a thin, bi-metallic foil member composed of copper on one side and aluminum on the other side thereof, said negative electrode comprising a layer of carbon adhered to said copper side of said bi-metallic member and said positive electrode comprising a layer containing a lithium transition metal oxide selected from the group consisting of $LiCoO_2$, $LiNiO_2$, $LiMn_2O_4$, $Li_2Mn_2O_4$ and mixtures thereof, adhered to the other aluminum side of said member, said positive and negative electrodes contacting and adhering to substantially the entire surface areas of the respective sides of said bi-metallic member, said electrolyte being a non-aqueous solution comprising a solute selected from the group consisting of $LiPF_6$, $LiBF_4$, $LiAsF_6$, $LiCF_3SO_3$, $LiN(CF_3SO_2)_2$, $LiClO_4$ and mixtures thereof, dissolved in a solvent selected from the group consisting of propylene carbonate, ethylene carbonate, diethyl carbonate, dimethoxyethane, dimethyl carbonate and mixtures thereof, and means for joining said unitary bipolar structure of adjacent cells together in a sealed stacked array.

13. A bipolar rechargeable lithium-ion battery according to claim 12, wherein said negative electrode comprises petroleum coke, carbon, graphite or mixtures thereof.

14. A bipolar rechargeable lithium-ion battery according to claim 13, wherein said means for joining said unitary bipolar structure of adjacent cells together comprises a non-conducting polymer ring surrounding the outer peripheral edges of said current-collecting element.

15. A bipolar rechargeable lithium-ion battery comprising: a plurality of individual electrochemical cells having positive and negative electrodes disposed in opposite face-to-face arrangement with a porous separator containing electrolyte therebetween, wherein the positive and negative electrodes of adjacent cells are disposed in electrical connection respectively with opposite sides of a common current-collecting element forming a unitary bipolar structure, said current-collecting element comprising copper on one of said opposite sides and aluminum on the other of said opposite sides, said negative electrode comprising a layer containing petroleum coke, carbon, graphite or mixtures thereof adhered to one of said opposite sides of said current-collecting element and said positive electrode comprising a layer containing a lithiated transition metal oxide selected from the group consisting of $LiCoO_2$, $LiNiO_2$, $LiMn_2O_4$, $Li_2Mn_2O_4$ or combinations of these materials adhered to the other opposite side of said element, and means for joining said unitary bipolar structure of adjacent cells together in a sealed stacked array.

16. A unitary bipolar structure for use in a rechargeable, lithium-ion battery comprising a solid, liquid impermeable, current-collecting element having opposite sides comprising copper and aluminum, a negative electrode comprising a layer containing petroleum coke, carbon, graphite or mixtures thereof adhered to one of said opposite sides of said element and a positive electrode comprising a layer containing a lithiated transition metal oxide selected from the group consisting of $LiCoO_2$, $LiNiO_2$, $LiMn_2O_4$, $Li_2Mn_2O_4$ and combinations of these materials adhered to the other opposite side of said element.

17. A bipolar rechargeable lithium-ion battery according to claim 15, wherein said negative electrode is disposed adjacent to and in electrical connection with the copper side of said current-collecting element and wherein said positive electrode is disposed adjacent to and in electrical connection with the aluminum side of said element.

18. A unitary bipolar structure according to claim 16, wherein said negative electrode is disposed adjacent to and in electrical connection with the copper side of said current-collecting element and wherein said positive electrode is disposed adjacent to and in electrical connection with the aluminum side of said element.

19. A bipolar rechargeable lithium-ion battery according to claim 1, wherein said current-collecting element comprising copper on one of said opposite sides and aluminum on the other of said opposite sides.

20. A bipolar rechargeable lithium-ion battery according to claim 7, wherein said ring comprises a tetrafluoroethylene-ethylene copolymer.

* * * * *